Feb. 24, 1970    F. G. BOUCHER    3,496,768
DETECTION OF MOVEMENT OF LIQUIDS IN THE EARTH
Filed July 9, 1968    2 Sheets-Sheet 1

Frank G. Boucher INVENTOR.

BY John B Davidson
ATTORNEY

Feb. 24, 1970     F. G. BOUCHER     3,496,768
DETECTION OF MOVEMENT OF LIQUIDS IN THE EARTH
Filed July 9, 1968     2 Sheets-Sheet 2

Frank G. Boucher INVENTOR.

BY *John B Davidson*

ATTORNEY

United States Patent Office 3,496,768
Patented Feb. 24, 1970

3,496,768
DETECTION OF MOVEMENT OF LIQUIDS IN THE EARTH
Frank G. Boucher, Tulsa, Okla., assignor to Esso Production Research Company, a corporation of Delaware
Filed July 9, 1968, Ser. No. 743,503
Int. Cl. E21b 47/10
U.S. Cl. 73—155                                3 Claims

ABSTRACT OF THE DISCLOSURE

Direction of movement of fluids in the earth is determined by making electrical measurements between a plurality of spaced-apart, differently oriented pairs of locations, making time records of the measurements, and correlating the records to determine the pair of locations between which the greatest potential is produced. The fluid movement can be produced by earth fracturing operations.

BACKGROUND OF THE INVENTION

This invention is concerned with the detection of liquid movement in the earth and more particularly is concerned with a technique for detecting the direction of preferential fluid movement through earth formations.

There exists a need in the industry for a simple, accurate method of determining the direction of movement of fluids in the earth for the purpose of determining the direction of increasing porosity in an earth formation from a reference location such as a borehole. As an example, such a method would be useful to determine the direction from a borehole that produces oil and gas toward which it would be most profitable to drill further boreholes for such recovery operations. Also, during fracturing operations wherein a viscous liquid is injected into an earth formation under high pressure, it is highly desirable to know the direction from a borehole in which the earth is fractured in order to facilitate recovery operations. Furthermore, in connection with waterflood operations for secondary recovery of earth fluids, it is desirable to know the direction in which the flood is progressing so that the flood can be controlled insofar as possible to increase its effectiveness. Preferably such detection techniques should involve only measurements at the earth's surfaces or in existing boreholes in order to minimize the costs thereof.

The general methods of petroleum exploration with naturally occurring electrical currents in the earth and with artificially injected electrical currents have been well known for many years. For example, the use of telluric currents is discussed in the Bulletin of the American Association of Petroleum Geologists, vol. 48, No. 12 (December 1964) at pp. 1819–1901; in the Journal of Geophysical Research, vol. 70, No. 8 (1965) at pp. 1939–1945. Further geophysical exploration using artificially induced electrical transients is well known to the art and is exemplified by U.S. Patent 2,160,824. Also, it has been known that piezoelectric potentials can be produced in the earth due to strains induced by pressure changes in earth formations, and that electrokinetic or streaming potential effects can be produced by the flow of certain liquids through the earth.

SUMMARY OF THE INVENTION

It has been now discovered that movement of fluids in earth formations can be detected by electrical measurements which can be made at the earth's surface. This phenomenon cannot be satisfactorily explained at the present time on the basis of technology as outlined above. The streaming potential effect would appear to be involved; however, the magnitude of earth currents known to be produced at the flow rates that are used in waterflooding and earth fracturing operations are so very minute that it is difficult to understand how they can possibly be detected at the earth's surface when flows are effected in formations far removed from the earth's surface. In addition, that which is known about magneto hydrodynamic effects due to the motion of the conducting fluids in the earth's magnetic field and piezoelectric effects due to strains induced by pressure changes in earth formations also cannot be relied upon to explain the present invention. It is possible that any and all of the effects recited above may be involved or that an unknown geophysical effect may be responsible for the phenomenon on which the invention is based.

In accordance with an aspect of the present invention the direction of movements of fluids through an earth formation is effected by measuring electrical potentials between a plurality of spaced-apart earth locations during the movement of the earth fluids and producing time records of said electrical potentials. Thereafter the time records are correlated to determine the orientation of spaced-apart locations producing greatest potential variations. Preferably, the spaced-apart locations are oriented symmetrically with respect to a given location in the earth, such as that of a wellbore or borehole. For example, one terminal of each pair of locations can be disposed at a distance from the borehole and the other location at or in the immediate vicinity of the borehole. The terminals spaced from the bore preferably should be substantially the same distance from the borehole and should be equally spaced apart around the borehole.

BRIEF DESCRIPTION OF THE DRAWING

Objects and features of the invention not apparent from the above discussion will become evident upon consideration of the following detailed description thereof when taken in connection with the accompanying drawing wherein FIG. 3 is a schematic diagram illustrating electrode placement in accordance with a preferred embodiment of the invention.

DESCRIPTION OF THE PREFERRED EMBODIMENTS

Figure 1:
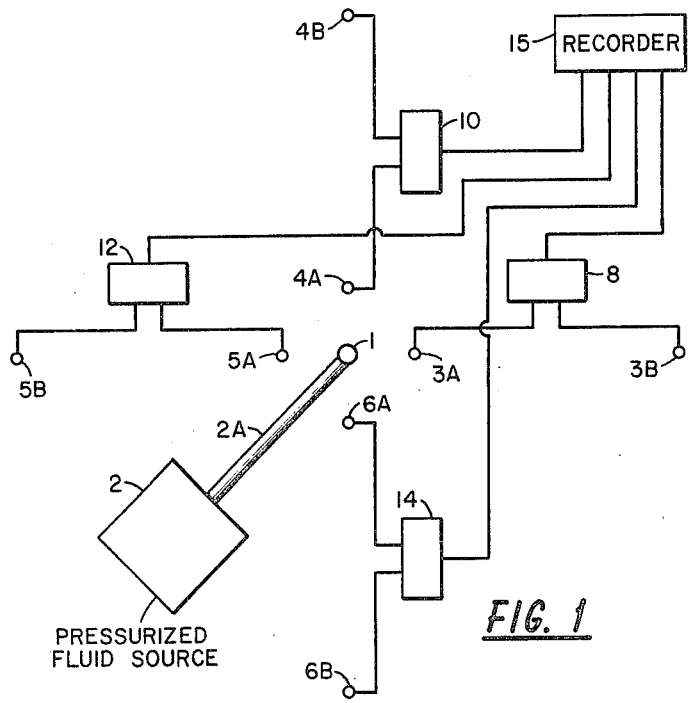
FIG. 1 is a schematic diagram of apparatus suitable for use with the invention shown disposed over the surface of the earth.

With reference now to FIG. 1, there is illustrated a plan view of the earth centered about a borehole 1 which extends downwardly into the earth at least to the depth of an earth formation that is desired for fracture or waterflood or from which it is desired to extract earth fluids. In accordance with customary practice, the borehole is cased and is provided with the customary wellhead equipment for effecting the desired operations. Such equipment is not shown in the drawing. A reservoir 2 is shown connected to the equipment at the wellbore 1 by a conduit 2A. The reservoir 2 may be a source of pressurized liquid such as is used in earth fracturing operations and in waterflooding operations or may be a tank battery for receiving earth fluids from the wellbore through the conduit 2A.

Disposed about the wellbore 1 and oriented therewith in various radial orientations from the wellbore are pairs of electrodes 4A–4B, 5A–5B, 6A–6B, and 3A–3B. As illustrated, the electrode pair 4A–4B lies along a line due north from the wellbore 1 and in line therewith. Similarly, electrode pair 3A–3B is oriented to the east of borehole 1, electrode pair 5A–5B to the west, and electrode pair 6A–6B to the south. Electrodes 3A, 4A, 5A, and 6A are substantially equally spaced from the borehole at distances up to about 1000 feet therefrom depending on conditions in the vicinity of the borehole such as vibrations, equipment, clutter, piping, etc. Electrodes 3B, 4B, 5B, and 6B also are substantially equally spaced from the borehole. The distance that electrodes 3B, 4B, 5B, and 6B are spaced from electrodes 3A, 4A, 5A, and 6A is determined by the depth of the formation through which liquids flow and are detected in accordance with the present invention. Insofar as can be determined at the present time, the spacing between pairs of electrodes should be not less than about 50 percent of the depth of the earth formation involved.

The pairs of electrodes 3A–3B, 4A–4B, 5A–5B, and 6A–6B are respectively connected to balancing, filtering, and amplifying circuits 8, 10, 12 and 14, which will be described in more detail below. The output signals from each of the circuits 8, 10, 12, and 14 are connected to a suitable recording means which may be a recording galvanometer such as a Model 18R oscillograph manufactured by Midwestern Instrument Company of Tulsa, Olka. which is adapted to record a plurality of electrical signals as traces in side-by-side relationship on the same time scale on a strip recording paper.

Figure 2:
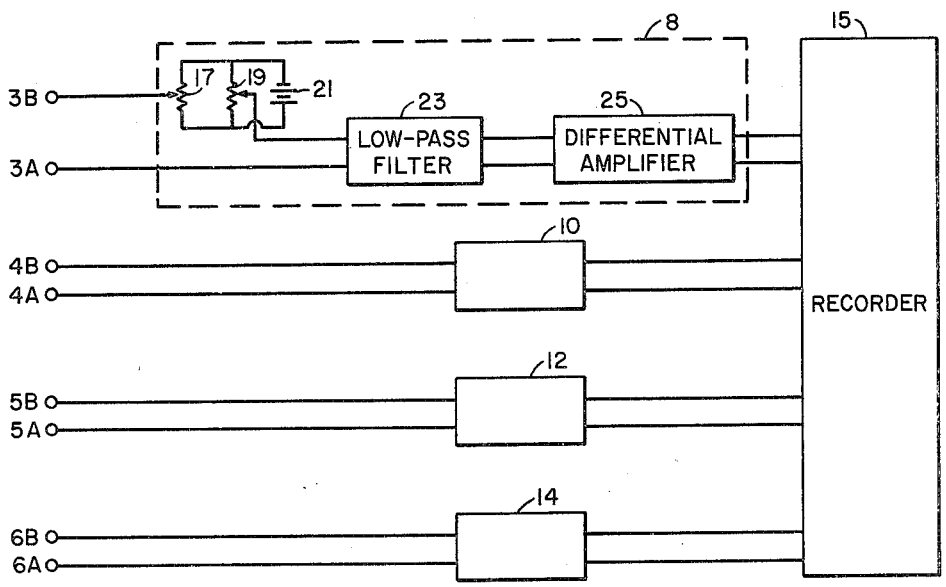
FIG. 2 is a schematic diagram of a portion of the apparatus of FIG. 1 showing certain components thereof in greater detail.

As mentioned above, each of the terminal pairs is coupled to recorder 15 through an equalizing, filtering, and amplifying circuit 8. Such a circuit is shown in FIG. 2 in more detail. As illustrated, one of the terminal pairs 3B is connected to an equalizing circuit comprising a battery 21 connected in parallel with a pair of potentiometers 17 and 19. The tap of potentiometer 17 is connected to terminal 3B and the tap of potentiometer 19 is connected to one of the input terminals of a filter 23. Filter 23 is a low-pass filter designed to cut off all frequencies above 5 or 10 Hz. Terminal 3A is connected directly to the input of the low-pass filter. The output of filter 23 is connected to a conventiona differential amplifier 25 such as manufactured by Geo. A. Philbrick Researchers Inc. of Dedham, Mass. The output of the differential amplifier is connected to one of the input circuits of recording oscillograph 15. The other equalizing, filtering, and amplifying circuits 10, 12, and 14 are identical to circuit 8. The taps of potentiometers 17 and 19 on each of the circuits 8, 10, 12, and 14 are adjusted so that, before fluid movement is induced in the earth formation as described below, the stray currents detected at the terminal pairs associated therewith produce output signals from the circuits 8, 10, 12, and 14 which are recorded by recorder 15 so as to produce traces which vary about a desired position or positions on the time axis of the recording paper of the recorder.

The various electrodes mentioned above should be non-polarizing electrodes designed to minimize the galvanometric or contact potential between the connection post or terminal thereof and the earth. Copper electrodes manufactured by Agra Engineering Company of Tulsa, Okla., may be used which comprise a plastic cup sealed at one end with a porous wooden plug and threaded at the other end. The plug is soaked prior to use in a copper sulfate solution. The cup is filled with saturated copper sulfate solution and a connection electrode is screwed into place at the threaded end of the plastic cup. When the electrodes are planted in holes in the earth, the holes should be soaked thoroughly with copper sulfate solution and the earth around the electrodes dampened periodically with copper sulfate solution. To prevent a battery cell from being established, the connector posts at the top of the electrodes should be kept dry.

The operation of the apparatus described above is as follows: Let it be assumed that the subsurface operation to be conducted is a fracturing operation wherein a viscous fracturing fluid is injected down a wellbore under high pressure against a formation intersected by the wellbore to fracture the formation for the purpose of increasing the migration of earth liquids through the formation to the wellbore. In this case the reservoir 2 will include fracturing trucks containing tanks of fracturing fluid which are connected to suitable wellhead apparatus through high-pressure pumps and fluid conduits in the usual manner. The electrodes 3A–3B, 4A–4B, 5A–5B, 6A–6B are laid out using the criterion described above. Greater numbers of electrodes variously oriented with respect to the wellbore may be used if desired. As illustrated in FIGURE 3 the electrode pairs may straddle the wellbore as long as the distance of one electrode from the wellbore is substantially greater than the distance of the other electrode. This is for the purpose of preventing equal voltages being produced across the electrodes which would have the effect of indicating an apparent zero movement of earth fluids in the zone of the earth monitored by the electrodes should there be equal movement in opposite directions. The recorder 15 is started and the fracturing operation commenced. The traces produced by the recorder 15 should be continually observed as long as the fracturing operation continues. Usually, at the initiation of fracturing a very large amplitude pulse will be observed on all traces. Thereafter, on certain of the traces it will be noted that the magnitude of the voltage produced across certain of the electrodes will gradually increase, indicating the fluid is flowing in the zone of the earth monitored by the electrodes. The total amplitude of the voltage indicated by the traces will be substantially proportional to the volume of fluid flow in the zone monitored by the electrodes producing the trace. By correlating the trace it is possible to obtain a very accurate picture of the direction of fluid movement through the earth formation relative to the borehole. Also, by observing the relative amplitudes and assuming that the system has been very carefully balanced previous to the fracturing operation, it is possible to obtain an idea of the extent of the fracturing operation.

As indicated above, the invention can also be used in connection with waterflood operations, the differences lying primarily in the type of fluid used and in the pressures to which the fluids are subjected. The invention can further be used during producing operations to obtain information as to the directions from which earth fluids are moving toward the borehole. In many areas an earth formation will have increasing porosity in one direction or another from the bore hole so that certain zones are preferentially depleted. In order to most effectively produce fluids from the earth, therefore, it may be desirable to space the wells differently in one direction from the borehole than in another direction from the borehole. In formations having low porosity obviously it is preferred that the wells be spaced more closely together. The invention can also be used to detect the penetration of a porous earth formation by a borehole being drilled using either cable tools or the rotary drilling technique. Electrical signals will be produced during the raising and dropping of the bit of a cable tool and the bailer associated therewith. When the borehole penetrates a porous formation, it has been found that a sharp increase in the magnitude of the signal will be produced. It is apparent that the reason the signals are produced is that drilling fluids are being forced in and out of the formation being drilled by the reciprocating action of the downhole drilling equipment. In rotary drilling the same effect can be accomplished by raising and lowering the drill string at spaced intervals.

The signal produced by movement of fluids through a borehole can be enhanced by adding a suitable additive to the fluid. A typical additive that may be used for this purpose is ferrous chloride.

Obviously, various modifications to the apparatus and technique described above may be effected within the spirit and scope of the invention. For example, it is possible to use only one electrode in place of the electrodes 3A, 4A, 5A, and 6A provided that the voltages appearing between the single electrode and the electrode spaced apart therefrom are carefully ballanced prior to a recording. Generally speaking, it will be found much easier to balance the voltages when separate electrodes are used. Furthermore, under certain circumstances it may be desirable to have the electrodes in wellbores spaced apart from the wellbore through which injection is to be effected. It is also possible to use the elongated pipes that case boreholes as an electrode provided that electrolytic voltages between the casings and the formations adjacent thereto are not so large as to make it impossible to balance the circuit before observations are conducted.

Although the embodiments disclosed in the preceding specification are preferred, other modifications will be apparent to those skilled in the art which do not depart from the scope of the broadest aspects of the invention.

What is claimed is:

1. A method of determining the preferential direction of fluid movement in an earth formation penetrated by a borehole, comprising:

locating pairs of electrical terminal locations straddling the borehole on straight lines passing through the location of said borehole, one terminal of each pair being located a substantially greater distance from the borehole than the other terminal;

applying fluid pressure to the face of the formation at said borehole to produce movement of fluids in the earth formation;

meansuring electrical potential between each of said pairs of locations; and producing a time record of electrical potentials thus measured; the direction of fluid movement being indicated by the relative magnitudes of variation in potential thus measured and recorded.

2. The method of claim 1 wherein the electrodes of each given pair of electrodes are spaced apart not less than 50% of the depth of the earth formation.

3. The method of claim 1 wherein the frequency of the measured earth potential is in the range of 0 to 10 Hz.

References Cited

UNITED STATES PATENTS

| 1,163,469 | 12/1915 | Schlumberger | 324—1 |
| 2,034,447 | 3/1936 | Schlumberger | 324—1 |
| 2,354,659 | 8/1944 | Bazhaw et al. | |
| 2,784,370 | 3/1957 | Morrison | 324—1 X |

JERRY W. MYRACLE, Primary Examiner

U.S. Cl. X.R.
324—1